United States Patent [19]

Siol et al.

[11] Patent Number: 4,772,506
[45] Date of Patent: Sep. 20, 1988

[54] GLASS WITH TEMPERATURE-CONTROLLED TRANSLUENCY

[75] Inventors: Werner Siol, Darmstadt; Joachim Otto, Biebesheim; Ulrich Terbrach, Reinheim, all of Fed. Rep. of Germany

[73] Assignee: Rohm GmbH Chemische Fabrik, Darmstadt, Fed. Rep. of Germany

[21] Appl. No.: 51,197

[22] Filed: May 18, 1987

Related U.S. Application Data

[63] Continuation of Ser. No. 784,758, Oct. 4, 1985, abandoned.

[30] Foreign Application Priority Data

Oct. 5, 1984 [DE] Fed. Rep. of Germany ....... 3436477

[51] Int. Cl.$^4$ .................. B32B 7/02; B32B 27/00; B32B 27/36
[52] U.S. Cl. .................... 428/212; 350/353; 428/323; 428/327; 428/412; 428/421; 428/423.1; 428/426; 428/474.4; 428/480; 428/522; 428/523; 428/913

[58] Field of Search .............. 428/212, 476.1, 327, 428/423.1, 426, 421, 480, 522, 523, 474.4, 323, 412, 913; 525/471, 260; 524/588; 350/353

[56] References Cited

U.S. PATENT DOCUMENTS

| | | | |
|---|---|---|---|
| 3,996,189 | 12/1976 | Travnicek | 524/588 X |
| 4,230,832 | 10/1980 | Wei | 525/260 |
| 4,307,942 | 12/1981 | Chahroudi | 350/353 |
| 4,609,714 | 9/1986 | Harris et al. | 525/471 |

Primary Examiner—Thomas J. Herbert
Attorney, Agent, or Firm—Oblon, Fisher, Spivak, McClelland & Maier

[57] ABSTRACT

A glass system with temperature controlled translucency, utilizing plastics, where the glass system comprises a polymer blend P, formed from unlike polymer constituents $P_1$ and $P_2$, and has a lower critical solution temperature (LCST), where under the critical solution temperature the polymer blend is single-phase and transparent and above the critical solution temperature polymer constituents $P_1$ and $P_2$ separate, and where the polymer constituents $P_1$ and $P_2$ have different indices of refraction.

64 Claims, 1 Drawing Sheet

$\emptyset$ = VOLUME BREAK OF POLYMER 1 OR 2

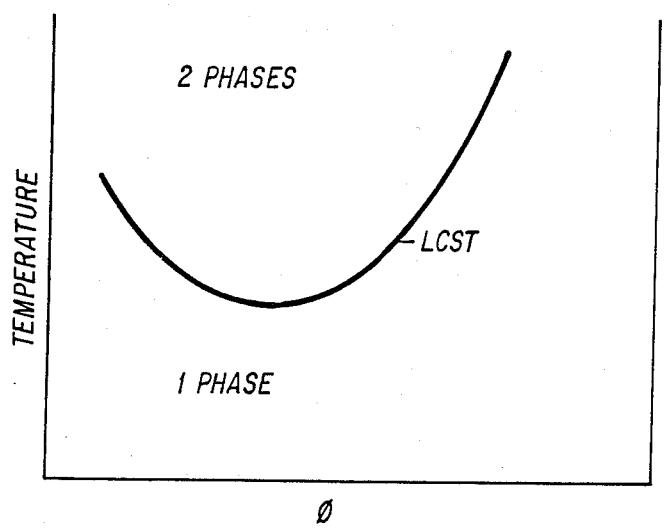
ø = VOLUME BREAK OF POLYMER 1 OR 2

GLASS WITH TEMPERATURE-CONTROLLED TRANSLUENCY

This application is a continuation of application Ser. No. 784,578, filed on Oct. 4, 1985, now abandoned.

BACKGROUND OF THE INVENTION

1. Field of the Invention

The invention relates to glass coverings with temperature-controlled translucency, i.e., light transmission that responds to a given threshold temperature.

2. Description of the Related Art

In most parts of the world it happens at least during the summer months that temperatures in enclosed or roofed-over spaces that are inhabited or otherwise used exceed the comfort range and/or are incompatible with the uses for which the spaces are intended. In many cases, incoming light adds considerably to the warming effect. The usual transparent glass coverings made of mineral glass or plastics normally act as a block to heat penetration. The next most obvious means of relief, used since time immemorial, is to reduce or shut out incoming light when certain measurements call for it, in particular when room temperature requires it, by means, for example, of shutters, jalousies, blinds, curtains and the like. It entails placing light-reflecting and/or absorbing layers inside or preferably outside the spaces in question, and this process can even be automated—although at considerable cost.

Special regulating equipment with all its associated costs and risks could be dispensed with if one could succeed in using the incoming light and/or the resulting heat itself for purposes of regulating heat or the transmission of light.

Substances with reversible, temperature-dependent transparency are the subject matter of DE-OS No. 27 38 253. Such substances are composed of at least one optically transparent polymer and/or resin material as a matrix (A) and at least one organic substance (B) at least partially insoluble in said matrix material which when embedded in the matrix material melts or solidifies at the critical temperature to alter optical transparency and whose index of refraction either above or below the critical temperature for optical transparency change essentially coincides with the index of refraction of the matrix material. (B) constitutes at all times a discrete dispersed phase embedded in (A). As suitable organic substances (B), substances of low molecular weight are mentioned, such as alkanols, alkyl amines, alkanes, alkenes, alkynes, saturated or unsaturated mono- or dicarboxylic acids, their esters and amides, halogen fatty acids, aryl carboxylic acids and their derivatives, thioalcohols, thiocarboxylic acids and their derivatives, etc.

Said substances are intended for use in temperature measurement devices, heat devices or screening devices for greenhouses, cold frames, industrial structures, office, residential and car windows and the like.

DE-OS No. 29 07 352 discloses the use of similarly synthesized systems containing crystallites or droplets of low molecular weight substances (preferably M=300–500) in dispersed form embedded in a polymer matrix for purposes of data storage.

JP-OS No. 83 78 758 (Chem. Abstr. 99 213730n) describes a temperature sensitive light-screening material that is composed of laminates of transparent panes with layers containing poly-N-isopropylmethacrylamide, water and if necessary, an additive to regulate the cloud point. DE-OS No. 26 58 643 discloses a glass-gel-glass sandwich structure with variable transparency. An acrylamide-N-methylolacrylamide copolymer is recommended for the fluid that irreversibly changes to a gel state at room temperature; the variability of transparency is achieved by the addition of polymethyl vinyl ether or vinyl caprolactam.

U.S. Pat. No. 4,307,942 discloses a device for preventing the penetration of sunlight above a given temperature that consists of a layer of a porous polymer material, a solvent and a temperature-sensitive substance with which the porous material is impregnated and which has negative solution entropy at the indicated temperature range.

A thermoplastic film with temperature-dependent light transmission is described in JP-OS No. 76 132241 (Chem. Abstr. 86, 91221n).

Such a thermoplastic film with polymer particles dispersed in it with diameters of $1-150\mu$ is supposed to allow at 40° C. less than 90% of the transmission allowed at 10° C.

An example of one embodiment is a mixture of 25 parts of polymethyl methacrylate (PMMA) and 75 parts of an ethylene vinyl acetate copolymer (72:28) that is agitated for 10 min. at 180° C. and 80 rpm and pressed into a layer 1 mm thick containing PMMA particles $5\mu$ in diameter.

JP-OS No. 79 12 518 (Chem. Abstr. 91, 124387e) shows how to make resins that are transparent only within a narrow temperature range. For that purpose, 2 to 50 parts of an ethylene vinyl acetate copolymer containing 10% to 35% vinyl acetate by weight are dissolved in 50 to 98 parts of methyl methacrylate (MMA) or in a monomer mixture consisting primarily of MMA and are polymerized by the radical method between glass plates.

A need continues to exist for new and improved glass systems with temperature-controlled light transmission that can supplement or replace traditional glass. Such glass must meet the normal mechanical and optical requirements, must—if possible—be simple to synthesize, must entail no added requirements and problems in terms of apparatus or technique, in other words, must be economical.

The glass system should preferably possess reversible temperature-controlled light-transmission capacity, and its functioning capability should be guaranteed for as long a period of time as possible. It will be an advantage if the threshold or critical temperature at which the transition from light transmission to reduced light transmission to no light transmission occurs can be set in advance, but it must also remain reproducible.

Glass pursuant to the invention is intended first and foremost as protective glass for rooms and other functional units, such as parts of buildings or vehicles, in the form of roofs, walls, windows and doors.

The term "glass" as used in this specification shall denote not so much the non-crystalline "glassy" state of ny polymeric material, but rather such matter that had been shaped to meet the demands normally associated with glass in the art of glazing, which in addition displays temperature-controlled light transmission, particularly in the visible range.

SUMMARY OF THE INVENTION

Accordingly, it is an object of the present invention to provide a glass of temperature-controlled translucency.

It is also an object of this invention to provide a glass having a temperature-controlled translucency, wherein said temperature controlled translucency is reversible and repeatable.

According to the present invention, the foregoing and other objects are attained by glass systems comprising polymer blends P formed from at least two polymer constituents $P_1$ and $P_2$, where polymer mixture P has a lower critical solution temperature (LCST) such that above the lower critical solution temperature polymer constituents $P_1$ and $P_2$ separate, and where polymer constituents $P_1$ and $P_2$ differ in their index of refraction.

BRIEF DESCRIPTION OF THE DRAWING

A more complete appreciation of the invention and many of the attendant advantages thereof will be readily obtained as the invention becomes better understood by reference to the following detailed description when considered in connection with the accompanying drawing, wherein:

The FIGURE shows the phase diagram for a polymer blend with lower critical solution temperature.

DETAILED DESCRIPTION OF THE PREFERRED EMBODIMENTS

In the present application pursuant to the invention as a component of glass, as defined particularly protective glass, the reversibility of phase separation above the LCST is of critical significance. Upon cooling to below the LCST, the system (which exists above the LCST as separate polymer phases $P_1$ and $P_2$) should return to the single-phase state, i.e., to full compatibility and if possible without other prior treatment of the system, e.g., by tempering at given temperatures, etc.

This process should be completely reversible, i.e., should be repeatable as often as desired and at any speed desired, but oriented to the temperature changes that can be expected in practice. The temperature changes that can be expected in practice generally lie within the range of 0.01° to 20° C. per minute.

ABOUT THE LCST

Unlike polymer species are generally incompatible with one another as a result of the low entropy of mixing (attributable to the long polymer chains) and the positive energy of mixing) between polymers. Certain exceptions to this rule have induced specialists in the art to work out the phenomenon experimentally.

Examples of miscibility are, e.g., polyvinylidene fluoride with polymethyl methacrylate (PMMA) or with polyethyl methacrylate (U.S. Pat. Nos. 3,253,060; 3,458,391; 3,459,843). A comprehensive description of miscible polymer systems can be found in, for example, D. R. Paul et al., Polymer Engineering & Science 18 (16) 1225–34 (1978). J. Macromol. Sci.-Rev. Macromol. Chem. C 18 (1) 109–168 (1980). Glass temperature Tg is often adduced in demonstrating miscibility. Another test of the miscibility of unlike polymers is said to be the appearance of a lower critical solution temperature (=LCST).

The appearance of an LCST relates to the process whereby as the polymer blend warms up, up to some point it is clear and homogeneous, but then the blend separates into phases and becomes optically cloudy to opaque. According to the literature, such behavior is clear evidence that the original polymer blend consisted of a single, homogeneous phase in equilibrium.

In many systems the separation is reversible upon cooling.

LCST behavior has been reported to date for the following polymer systems: PMMA/styrene-acrylonitrile copolymers; polystyrene/polyvinyl methyl ether; poly-$\epsilon$-caprolactone/styrene-acrylonitrile copolymers; chlorinated rubber/ethylene-vinyl acetate copolymers; PVC/ethylene-vinyl acetate copolymers; poly-$\epsilon$-caprolactone/polycarbonate; polyvinylidene fluoride/PMMA; polyvinylidene fluoride/polyethyl methacrylate; polyvinylidene fluoride/polymethyl acrylate; polyvinylidene fluoride/polyethyl acrylate; polyphenylene oxide/o-chloro-styrene-p-chlorostyrene copolymers; polystyrene/polycarbonate of tetramethyl-bisphenol-A; polyvinyl nitrate/polymethyl acrylate (D. R. Paul et al., loc. cit.); and for the polymer systems PVC/poly-n-hexylmethacrylate, PVC/poly-n-butyl acrylate, poly-n-propyl acrylate (D. J. Walsh and J. G. McKeown, Polymer 21, 1330–1334 (1980); and for chlorinated polyethylene/butyl acrylate (D. J. Walsh et al., Makromol. Chem. 184, 1459–1468 (1983); and for PMMA/chlorinated polyethylene (D. J. Walsh et al., Polymer 23, 336–339 (1982).

The FIGURE shows the phase diagram for such polymer blends with lower critical solution temperature.

Compatible polymer blends that have an LCST have up to now been studied only from a pure research standpoint. Using the phenomenon to solve well-defined technical problems has not yet been proposed. The reason for this may be, among other things, that the cloud points of the compatible polymer blends with LCST known to date are often not observed until very high temperatures are reached, which may be in the vicinity of the decomposition temperature of the polymers.

The prerequisite for the suitability of polymer blends P as a component of glass with temperature-controlled translucency is in general that the refraction indices of the different polymer constituents should be different. It is useful if the polymer constituents $P_1$ and $P_2$ of polymer blend P differ in their refraction indices by a value of at least 0.01, and preferably 0.03. (Determination of the refraction index is done in the usual manner. See R. Vieweg, D. Braun, *Kunststoff-Handbuch*, Bd. I Grundlagen [Plastics Handbook, Vol. I, Principles], pp. 647–651, Carl Hanser Verlag, Munich-Vienna, 1975.)

Particularly suitable in accordance with the present invention are polymer blends P with LCST whose LCST is under 150° C., preferably under 100° C., and particularly under 50° C. It is also advantageous to the process when the condition is met that when temperature increases from a value of 10° C. under the LCST to a value 10° C. over the LCST, there is a reduction in transmission of at least 20%.

Determination of transmission should be done on an unpigmented test plate 0.1 mm thick. (Determination of transmission should be in accordance with German industrial standard DIN 1349). It is especially preferred that test transmission within the range of 10° C. under the LCST to at least 50° C. under the LCST measure more than 80%; in particular, the reduction in transmission from cover 80% to less than 60% should take place in a temperature interval of <20° C.

It is also desirable that above the LCST, i.e., in separated form, two polymer phases (from $P_1$ and $P_2$ and/or $P_3$) should co-exist, of which at least one polymer phase exhibits a domain magnitude within the range of 10 $nm^2$ to $10^8$ nm$^2$, preferably between $10^2$ nm$^2$ and $10^6$ nm$^2$, and that the polymer phases differ by at least 0.01 in their refraction indices. From the standpoint of material composition, it is an advantage if the glass temperature Tg of the compatible polymer blend P is at least 20° C., preferably at least 50° C. and particularly preferably at least 100° C. under the LCST. By the glass temperature of the compatible polymer blend P is meant the glass temperature of the (homogeneous) system as a whole, consisting of the polymer constitutents $P_1$ and $P_2$ and possibly other polymer and low molecular weight constituents such as solvents, plasticizers, stabilizers, pigments, etc. (On determining the Tg, see D. R. Paul & S. Newman, *Polymer Blends*, Vol. I, Chap. 5, Academic Press, New York, 1978.) Preferably, the glass temperature of the compatible polymer blend P should be under 50° C., better yet under 0° C. (Instead of glass temperature Tg, the dynamic transformation temperature Tg (dyn), which is determined in accordance with DIN 7724 and is on the average roughly 30° higher, can be used as the reference figure. See R. Vieweg, F. Esser in *Kunststoff-Handbuck*, Vol. IX, pp. 333–339, Carl Hanser Verlag, Munich, 1975; Kirk-Othmer 3rd Ed. Vol. 18, pg. 443–478, J. Wiley 1982.

Polymer blend P, made up of at least two different polymers $P_1$ and $P_2$, may as a total system contain if necessary—as already mentioned—one or more other organic substances W of low molecular weight. It is helpful when the low molecular weight substance W has the property of being a solvent for at least one of the two polymers $P_1$ and $P_2$. Furthermore, the low molecular weight substance W may exhibit a different index of refraction than polymers $P_1$ and $P_2$ or other polymers present in system P. This creates the possibility that even when there is only a slight difference between the refraction indices of $P_1$ and $P_2$ because of unequal distribution of the low molecular weight substance W between the two incompatible polymers light scattering may occur. In this connection, however, it must be borne in mind that any asymmetry in the reciprocal action of polymer-solvent in a ternary polymer $P_1$/polymer $P_2$/solvent system can cause a phase separation. Therefore, one will in general use a solvent that exhibits a slight asymmetry in the reciprocal action of polymer-solvent.

As a general rule, the low molecular weight substance W will be an organic substance, i.e., not water. Preferably, low molecular weight substance W should belong to the category of plasticizers and/or solvents for polymers. (See H. Gnamm, O, Fuchs, *Losungsmittel and Weichmachungsmittel* [Solvents and Plasticizers], 8th Ed., Vol. I & II, Wissenschaftliche Verlagsgesellschaft mbH, Stuttgart, 1980.) The low molecular weight substances W should have a solid point preferably below 10° C.; it is beneficial when the solid point lies at least 50° C. under the LCST of polymer system P composed of $P_1$, $P_2$, etc.

In general, the content of low molecular weight organic substances W should be from 0.1% to 1000% by weight, preferably from 5% to 300% by weight, of the weight of polymers $P_1$ and $P_2$, etc.

The addition of low molecular weight substances serves as a rule to lower the glass temperature of polymer blends P and the glass temperatures of polymers $P_1$ and $P_2$ and hence to increase the flexibility of polymers $P_1$ and $P_2$ and polymer blend P. Good flexibility of the polymer chains is particularly important in achieving a reversible phase transition. Specifically, if there is insufficient flexibility in the polymers, when the system is cooled quickly from a temperature above the LCST at which the two separated polymer phases $P_1$ and $P_2$ co-exist side by side, the two-phase nature of the system may become set even at temperatures below the LCST. Given insufficient polymer flexibility, therefore, the phase transition is often irreversible.

In addition, the polymer chain may also be plasticized by copolymerization with plasticizing monomers (internal plasticization). In contrast to the addition of low molecular weight substances, such internal plasticization offers the advantage that the plasticizer cannot escape. Furthermore, the addition of plasticizers or other low molecular weight substances can be used to fix the position of the LCST and hence the position of the transition from clear to opaque and the reverse in the desired temperature range (see in this regard R. E. Bernstein et al., Macromolecules 10, 681–686, 1977).

POLYMER BLEND P

Polymer blend P is made up of at least two polymer constituents $P_1$ and $P_2$. Polymer constituents $P_1$ and $P_2$ are structurally unlike, and their dissimilarity should be complementary in such a way that energetic interactions between polymers $P_1$ and $P_2$ are facilitated. The mixture enthalpy for both polymer constituents $P_1$ and $P_2$ is thus exothermic. The miscibility of the two polymers $P_1$ and $P_2$ depends, therefore, insofar as we know at this point, on the exothermic interaction of the various segment pairs.

Such interaction may comprise a variety of different mechanisms, such as salt formation, hydrogen bridges, complex formation, coupling of phenyl groups, dipolar interaction. In this connection, it is generally sufficient if the mixing enthalpy of polymer constituents $P_1$ and $P_2$ is only slightly negative.

The mixing entropy should generally be positive (but plays only a subordinate role because of the minimal contribution). With these criteria the polymer blends known to date to be compatible can be understood, and new compatible polymer pairs can be readily discovered (See D. R. Paul et al., J. Macromol. Sci.-Rev. Macromol. Chem. C. 18 (1), 109–168, 1980).

The use pursuant to the invention of compatible polymer blends P with temperature-controlled translucency in a great many applications, e.g., as protective glass for buildings, vehicles, and the like, further requires, however, the separation of the incompatible polymer constituents $P_1$ and $P_2$ to occur at relatively low temperatures, i.e., a low LCST.

This means that the interaction between the polymers must not be so strong that the separation of polymer constituents $P_1$ and $P_2$ does not take place until around 300° C., for example, as is the case with the PVDF/PMA polymer system, for instance. For the use pursuant to the invention of compatible polymer mixtures P, the mixture enthalpy of polymers $P_1$ and $P_2$ should be only slightly negative. Weak interaction—and hence also a low LCST—can be achieved with a large proportion of weak-interacting groups/polymer molecules or else with a small proportion of strong-interacting groups. As a rule, a high proportion of weak-interacting groups (e.g. dipole-dipole interactions) is preferred.

The addition of low molecular weight substances W (e.g., solvent or plasticizer) also offers the chance to reduce the interaction of polymer 1/polymer 2. Preferably, at least one of the two polymer constituents $P_1$ or $P_2$ is not soluble in water in the temperature range of 0° to 100° C.; it is important that the two polymer constituents of polymer blend P not both be soluble in water. (The solubility of polymers in solvents is usually described as a cooperative effect, i.e., the solubility of the polymers is at least 50 grams per liter of solvent S at 22° C., or only negligible amounts are dissolved. The first case is what is meant by "soluble in solvent S.")

Polymer blend P is composed of at least two chemically different polymers $P_1$ and $P_2$. At least one of the two polymers should preferably have a carbon content of <80%.

It is also preferred that at least one of the two polymers be composed at least 5% by weight (in relation to polymer constituent $P_1$ or $P_2$) of a group with a double or triple bond involving carbon. We might mention the —C=C—, C=O, —C≡N, —C≡C—, —C=N—

groups. At least one of the polymer constituents $P_1$ or $P_2$ should preferably contain a covalently bonded halogen, particularly fluorine, chlorine or bromine, preferably in a proportion of >10% by weight and/or a chalcogen, particularly oxygen and/or sulfur, preferably in a proportion of >10% by weight.

It is helpful if the ratio of the halogen content (as % by weight) in polymer $P_1$ to the halogen content of polymer $P_2$ is >1.5:1, or better yet >2:1. The ratio of the oxygen content of polymer $P_1$ to the oxygen content of polymer $P_2$ should preferably be >1.2:1, or better yet >1.5:1.

It is also advantageous when at least one of the polymers that make up polymer blend P is a copolymer constituent in which the monomer that forms the main constituent constitutes no more than 95% by weight.

It also is an advantage when the polymer blend P exhibits a single glass temperature Tg below the LCST in the total range from −30° C. up to the LCST and contains no crystalline areas.

It is helpful when the polymer constituents of the polymer blend P are so synthesized that neither polymer $P_1$ nor $P_2$ (or other polymers that may be present) undergoes a chemical change at the LCST that involves more than 1% of the monomer units within the space of one hour.

The stability of the polymer constituents can be enhanced in ways already known by the addition of ultraviolet absorbers, antioxidants, and aging and weathering protectors, etc. (see *Ullmanns Encyklopadie der Tech. Chemie*, 4th Ed., Vol. 15, Verlag Chemie, pp. 255 ff). They should in general constitute a proportion of between 0.01% and 5% by weight and preferably between 0.1% to 1% by weight in relation to polymer blend P. We might mention in particular sterically hindered phenols, phosphites, thioethers, sterically hindered amines, benzophenones, benzotriazoles, oxalanilide.

Generally speaking, the (average) molecular weight of the two polymers $P_1$ and $P_2$ should be at least 2,000, preferably at least 10,000. (The determination of molecular weight is done by the well-known method of light scattering. Concerning determination of molecular weight see R. Vieweg, D. Braun, *Kunststoff-Handbuch*, Vol. I, loc. cit., pp. 342 ff.) It is advantageous if at least one of the polymers has an average molecular weight $\overline{M}_w$ within the range of 2,000 to 500,000, preferably 10,000 to 500,000. It is beneficial when both polymers $P_1$ and $P_2$ have average molecular weights within the range from 2,000 to 500,000, preferably 10,000 to 500,000.

Systems of particular interest are obtained when the polymer constituents involved, in other words, $P_1$ and $P_2$, are partially covalently bonded—generally to the extent of at least 0.1%. Such covalent linkages can be obtained if, for example, the polymers are block polymers or by grafting. For this purpose the individual blocks taken separately must have a molecular weight of at least 5,000.

It is often sufficient merely to polymerize one polymer in the presence of the other.

The block or graft polymerization can be done relying on state of the art processes. For details on the fabrication of block and graft polymerizates, the reader is referred to the literature on the subject, e.g., Houben-Weyl, Methoden der Org. Chemie, 14/1, pp. 110 ff, Block Copolymers, D. C. Allport, W. H. Jansen, Appl. Sci. Publishers Ltd., London, 1973; Graft Copolymers, H. A. J. Battaerd, G. W. Tregear, Polymer Reviews, Vol. 16 (1967); Block and Graft Polymers, W. J. Burlant, A. S. Hoffman, Reinhold Publishers Corp., New York, 1960.

The following are guidelines for the blend ratio in polymer system P: a weight ratio of polymer $P_1$ to polymer $P_2$ in the range of 98:2 to 2:98, preferably 90:10 to 10:90, and better yet 80:20 to 20:80. Polymer blend P may be colorless, but it may also be colored in a manner suitable to the intended application. It may also contain known ultraviolet absorbers (see Ullmanns Enzyclopädie, loc. cit.).

For the coloring it is preferable to use a coloring agent of the type already known to the art that is soluble in the polymer system or a pigment coloring agent with discrete pigment particles. In the latter case, it will be helpful if the diameter of the pigment particles does not exceed 50% of the average diameter of the polymer phase domains created by the separation of polymers $P_1$ and $P_2$.

Coloring agents and pigments of the appropriate kind can be found, for example, in Ullman's Encyclopädie, 4th Ed., Vol. 15, loc. cit., pp. 275-280 (1978).

The coloring agent content should fall into the customary ranges, e.g., between 0.01% and 10% by weight in relation to polymer blend P.

Polymer blend P can be used for a variety of technical applications.

First of all, polymer blend P may be used directly and without a support base that is distinguishable from polymer blend P. For this type of application, it is helpful if the Tg of the polymer blend P is higher than 30° C.

Another type of application of polymer blend P entails the use of a support base. In most cases polymer blend P will be drawn over and adhere to the support base. Two-sided lamination of a support base is also possible. A third, preferred case is when the polymer blend P is positioned between a supporting layer and a covering layer. In such case the supporting and covering layers may be of the same material and/or shape. As a rule the support base will be of a transparent material, as will the covering layer. In most cases the support base and the covering layer will be of the same material and will have the same dimensions. For practical reasons, the material used for the support base should have a glass temperature Tg that is >50° C., or better yet >90° C. If soft materials are used for the support base, they should be cross-linked like rubbers.

The temperature resistance must be such that it does not interfere with the thermal treatment of polymer blend P, i.e., as a rule it should be at least 50° C. higher than the LCST of the system.

Transparent, inorganic materials, like a mineral glass such as silicate glass, are suitable for use as a support base. Synthetic plastics may also be used, provided they meet the above requirements. For instance, from among the plastics, acrylic resins, particularly those with a polymethyl methacrylate base, or acrylic resins modified by comonomers such as (meth)acrylonitrile, styrene, other (meth)acrylates, etc. "Acrylic glass" are suitable for use.

In addition, polycarbonates, polyolefins, PVC, polyamides, polyesters, polyimides, polystyrenes, polyurethanes, polyacetals, polysulfones are usable.

Of special interest is an application in which polymer blends P are embedded between supporting and covering layers (which will usually not differ).

Generally speaking, the geometric shapes that polymer blends P can assume are not subject to limitations inherent in the material. When they are used with a support base or are embedded, the geometric shape that the polymer blends take on will generally be determined by the shape of the support base and in some cases by the covering layer.

Polymer blend P, alone or on a support base or embedded, will, for example, take the form of a sheet, pane or film. In the form of a film, it can be applied very lightly over an already existing glass, on a pane of mineral glass or plastic, for example.

Polymer blend P can also be applied by dipping, molding, injection, etc. in a suitable form, such as a liquid or plasticized or dissolved form. Of particular interest is processing by extrusion, particularly by coextrusion together with the support base and/or the covering layer.

The support base may—as stated previously—be colored in a suitable manner. In this way it can, for example, assume the function of a filter for various wavelengths or parts of the light spectrum.

Polymer blends P may be embedded in a (transparent) material whose index of refraction coincides with the index of refraction of the polymer blends P under the LCST. It is an advantage if the material used for the embedding has a glass temperature of >50°. Materials suitable for the embedding process may, for example, be selected from the group of polymers mentioned above as suitable for a support base. In many cases it will be sufficient to use polymer blends P in a layer <1 mm thick, preferably 0.1 mm thick, and even better <0.05 mm thick, whereby the polymer blend P can be laid on or embedded in a support base or used without a support base. Of special interest is the case of an embedding between the polymer blend P in a material whose index of refraction coincides with the index of refraction of the polymer blend under the LCST and hence constitutes a matrix M.

Of special interest are glass systems in which the polymer blend P is embedded in a material M serving as a matrix in the form of discrete particles with a diameter in a range of 20 nm to 200 $\mu$m, preferably 50 nm to 500 $\mu$m.

In that situation particles with a diameter in the range of 50 nm to 5 $\mu$m are particularly to be preferred. It is possible to produce these fine particles by emulsion polymerization of at least one of the polymer constituents $P_1$ or $P_2$. Of special interest is the production of polymer constituents $P_1$ and $P_2$ of polymer blend P in an emulsion polymerization process comprising at least two steps. In an especially preferred form of the process, a latex primarily synthesized from polymer constituent $P_1$ serves as a seed latex for the emulsion polymerization of polymer constituent $P_2$. It can also be advantageous to use the above-mentioned latex containing polymer constituent $P_1$ and/or $P_2$ as a seed latex for the emulsion polymerization of a polymer constituent PM, where PM is compatible with matrix M or chemically the same as matrix M, the latter being especially preferred. This PM component serves to anchor polymer blend P in matrix M. As a general rule, matrix M will not form a compatible polymer blend with either of the polymer constituents $P_1$ or $P_2$ from which polymer blend P is made.

Furthermore, it is generally true when polymer blend P is embedded in a matrix M in the form of particles that polymer blend P coincides with matrix M broadly speaking in respect of their indices of refraction below the LCST ($\Delta$n generally <0.01). Furthermore, it generally holds that $n_{D\ matrix} > n_{D\ polymerizate\ 1}$ ($\Delta$n>0.01), while at the same time $n_{D\ matrix} < n_{D\ polymerizate\ 2}$ ($\Delta$n>0.01).

The (minimum) layer thickness of polymer blends P by themselves and in the various geometric configurations used is determined on the one hand by the requisite coherence of the layer and on the other hand by the requisite difference in transmission above and below the LCST. As an approximate value for the thickness of the layer, a value of 10 $\mu$m to 1 mm can be stated.

POLYMERS $P_1$ AND $P_2$

First of all, one can start with the polymer blends available in the current state of the art that exhibit LCST (see "Detailed description of the preferred embodiments"). An additional criterion of selection can be applied, namely, that the LCST of the polymer blend P should be under 150° C., preferably under 100° C., and better yet under 50° C. Many systems, however, require modification by variation of at least one of parameters (a), (b), (c) or (d)—see below—in order to be used pursuant to the invention as a component of glass, as part of safety glass, for example.

Among the polymer blends that exhibit LCST are the well-known polymer blends P formed from polyethyl methacrylate/polyvinylidene fluoride (LCST=240° C.) and PMMA/styrene-acrylonitrile copolymers (LCST=170° C.), which do not seem very suitable because of their high LCST. Of technical interest is the polystyrene/polyvinyl methyl ether system with a cloud point of approx. 120° C.—M. Bank et al., Macromolecules 4, 43 (1971) J. Polym. Sci., Polym. Phys. Ed. 10, 1097 (1972), T. Nishi et al., Polymer 16, 285 (1975), T. I. Kwei et al., Macromolecules 7, 667 (1974)—which will be referred to hereinafter as $P_1$-I/$P_2$-I. In addition, of special interest are the well-known polymer blends P formed from a carbonyl-group-containing polymer $P_1$ and a halogen containing polymer $P_2$, particularly polymer blends of an ester-group containing polymer $P_1$ and a chlorine-containing polymer $P_2$, such as the polymer blend of an ethylene-vinyl acetate coppolymer (hereinafter referred to as $P_1$-II) and chlorinated polyethylene (hereinafter referred to as $P_2$-II), and the polymer system P composed of butyl acrylate/chlorinated polyethylene, hereinafter referred to as $P_1$-III/$P_2$-II, as well as the system of PMMA/chlorinated polyethylene, hereinafter referred to as $P_1$-IV/$P_2$-II.

In addition, the systems poly-n-hexylmethacrylate/PVC, poly-n-butylacrylate/PVC and poly-n-propylacrylate/PVC are worthy of mention.

Substantial variations may be made in the system: ester-group-containing polymer as $P_1$ and chlorine-containing polymer as $P_2$. The requirements are that the chlorine component in polymer $P_2$ be high enough (generally between 25%–75% by weight) and that a sufficient number of carbonyl groups be available as interaction partners in polymer $P_1$. The percentage weight of the carbonyl groups (C=O) is generally in the 10–35% range.

As an example of further variations possible on the system of ester carbonyl group in polymer 1/chlorine-containing polymer 2, we will mention the following novel systems based on polymethacrylate/chlorinated rubber. Copolymers of isobutyl methacrylate and 2-ethylhexylmethacrylate (hereinafter referred to as $P_1$-V) and chlorinated rubber (hereinafter referred to as $P_2$-III) and copolymers of methyl methacrylate and ethyl acrylate (hereinafter referred to as $P_1$-VI) and chlorinated rubber (hereinafter referred to as $P_2$-III).

The precise position of the cloud point (LCST) usually is found to be influenced by a variation in one or more of the following parameters, within certain limits:

(a) By a change in the proportions of interacting groups in polymers $P_1$ and $P_2$; this can come about by copolymerization with another monomer or by a change in the monomer units within a homologous series. Thus, for example, in the series polymethyl methacrylate, polyethyl methacrylate, polybutyl methacrylate, the proportion of ester groups in the polymer keeps declining. In this context it is generally true that the LCST drops when the proportion of interactive groups declines, and conversely that polymers with higher concentrations of functional groups (e.g., concentration of chlorine in polymer $P_2$ and ester groups in polymer $P_1$) exhibit higher LCST's (See D. J. Walsh et al., Macromolecules 16, 388–391, 1983).

(b) By changing the proportions of $P_1$ and $P_1$ (see the FIGURE and if necessary by adding another polymer $P_3$ to the polymer blend P.

(c) By the addition of one or more low molecular weight substances W as plasticizers and/or solvents. As a rule, the addition of low molecular weight substances W particularly when only small amounts, e.g., 10% by weight in relation to polymer blend P, are used causes the LCST to drop. The addition of plasticizers in particular increases the flexibility of the system P (see R. E. Bernstein et al., Macromolecules 10, 681–686, 1977).

(d) By changing the molecular weight of polymers $P_1$ and $P_2$. In general, the higher the molecular weight the lower the LCST (J. H. Halary et al., Polymer, 25, 956–962, 1984). The molecular weight selected should not be too high, however, e.g., it should preferably be $<10^6$ or even better $\leq 500,000$, since at higher molecular weights kinetic effects play too large a role (see D. J. Walsh, Zhikuan Chai, Macromol. Chem. 184, 1459–1468, 1983).

The above allows for a certain latitude in the selection of the threshold temperature at which the glass units become opaque.

As a general rule of thumb, polymer blends P that contain little or preferably no crystalline portions and comprise at least one polymer component accessible by radical polymerization are preferred. In this regard, polymers containing acrylates and methacrylates, are of interest since here the interaction of polymer $P_1$ with polymer $P_2$ can be carefully graded by changing the alcohol component of the ester and in the case of copolymers by changing the proportions of the different copolymers. Moreover, in the case of copolymers containing acrylates and methacrylates it is relatively easy by copolymerization of relatively "soft" comonomers to lower the glass temperature of the polymer. By relative soft comonomers are meant those whose homopolymers have a dynamic transformation temperature (determined according to DIN 7724) of less than 50° C. (For more information see Brandrup-Immergut, *Polymer Handbook* loc. cit.)

Also of interest as polymer constituents in the production of polymer blends P with temperature-controlled opacity are polymers and copolymers $P_1$ (or $P_2$) that contain styrene or a homolog of styrene, with which polyvinyl ether is preferred as polymer constituent $P_2$ (or $P_1$). In addition, ethylene vinyl ester copolymers are suitable as constituent $P_1$ (or $P_2$), with preferably a polymer of halogenated hydrocarbons, such as chlorinated polyethylene, as $P_2$.

Polymer blends that meet the selection criteria of P can be discovered systematically, by keeping one constituent the same, $P_1$, for example, and varying $P_2$ each time. [See J. S. Higgins, D. J. Walsh in Polym. Engineering & Science 24 (8) 555–562 (1984).] One can proceed, for example, as follows: to polymer constituent $P_1$, dissolved in a suitable solvent such as toluene, are added and mixed solutions of polymer constituent $P_2$ in different quantity ratios to one another. A film is then drawn out, and this film is judged visually first at room temperature and then at a higher temperature (e.g., 100° C., 140° C.). Polymer incompatibility often reveals itself through opacity when the polymer solutions are being mixed in the test tube. In this process the choice of solvent is important in order to avoid a great asymmetry in the polymer-solvent interaction.

Another possibility is to mix the polymers in the melt. It is generally necessary, however, to work at a temperature under the LCST, because a blend test above LCST will yield two phases from the start.

A simple method of mixing the polymers is to make a homogeneous solution of polymers $P_1$ and $P_2$ in a solvent and to precipitate this solution containing both polymer species $P_1$ and $P_2$ with a non-solvent.

Another possibility is to polymerize the monomers of one polymer, $P_1$, for example, in the presence of polymer $P_2$. One can also use the monomers from which polymer $P_1$ is synthesized as a solvent for $P_2$. But, here again, with some compositions phase separation is to be expected, so that the polymerization of polymer 1 must sometimes be done in several stages. See also J. S. Higgens and D. J. Walsh, Polymer Engineering and Science, 24, 555 (1984).

ON THE CONFIGURATION OF THE POLYMER BLENDS P; FABRICATION OF THE GLASS PRODUCTS FOR GLAZING

Polymer blend P, containing if necessary low molecular weight substance W in the form of a plasticizer and/or a solvent, can be applied to a support as is. Polymer blend P, if necessary in the form of a mixture containing a low molecular weight substance W, can be made to adhere to support bases and covering layers (generally of the same material). It can also be embedded between supporting and covering layers in the manner of a monomer/polymer (mopo) system. An inorganic glass presents no problems as support and covering layer, since it is not penetrable by polymer constituents $P_1$ and $P_2$ nor by any low molecular weight substances that may be present. If, on the other hand, a synthetic plastic is used as the supporting and/or covering layer, one must be careful that the material does not over the course of time alter the polymer system P. Thus, it is not advantageous to use as supporting and/or covering layer a polymer that will be affected by the plasticizer that may be in polymer system P. Nor, as a general rule, will one choose the material to be used for the supporting or covering layer from a series of polymers that yields a compatible polymer blend with both or one of the two polymer constituents $P_1$ or $P_2$. The interaction mentioned between the supporting or covering layer and/or polymer system $P_1$, $P_2$ and/or the plasticizer could gradually change the LCST or otherwise interfere with the system.

Polymer blend P can also be prepared by coprecipitation and applied as is to the support base, particularly by extrusion.

The various processes of the plastics industry are suitable for working and processing polymer blend P, and the various physical and chemical data of a polymer blend P as currently used, such as its Tg, LCST, heat resistance, etc., are taken into account.

Polymer blend P may, for example, be produced or processed by injection mold.

In other cases, polymer blend P may be produced and/or processed by extrusion, applied to a supporting base, for example. A particularly interesting method is coextrusion, together with the supporting and/or covering layer, for example.

In both cases it is advantageous to process polymer blend P at a temperature below the LCST.

Possible candidates among the plastics for support base are the transparent plastics such as acrylic resins, polyolefins, polyvinyl chloride, polyamides, polyesters, polyurethane, polyimides, polysulfones, polyacetals and polystyrenes.

Coextrusion may be performed using known methods, making use of a multi-material nozzle, for example. (D. Djordjevic in "Die neue Verpackung", Issue 7, pp. 1041 ff (1978), J. E. Johnson in "Der Kunststoffberater", 10 pp. 538–541, 1976.) For extrusion and coextrusion of polymer blends P, one can rely completely on current practice in the art (see Kirk-Othmer, 3rd Ed., Vol. 18, pp. 185–190).

ADVANTAGES

Glass products pursuant to the invention with temperature controlled translucency are suitable for all kinds of safety glass, for rooms and other functional units, such as parts of buildings or vehicles, in the form of roofs, walls, windows, doors and equipment or parts thereof, in short for most any kind of glazing.

We mention by way of indication use in greenhouses, stables, sports facilities such as indoor swimming pools, gymnasiums, and other glass panelled or glass-roofed buildings and parts of buildings such as conservatories, porches, entrance halls, stairwells, telephone booths, skylights, roofs of cranes, construction machinery, tractors, buses, boats, ships, enclosures such as shop windows, show cases, slide files, and as protection against overheating, e.g., on solar cells, etc.

The temperature at which the system becomes opaque, i.e., the LCST, can be chosen at will according to the various requirements.

As previously mentioned, polymer blends that meet the conditions required by systems P pursuant to the invention can be discovered deliberately and systematically.

The invention now being generally described, the same will be better understood by reference to certain specific examples which are included herein for purposes of illustration only and are not intended to be limiting of the invention or any embodiment thereof, unless specified.

EXAMPLE 1

Selective Development of a Polymer Blend P

Chlorinated rubber (67% chlorine by weight) is dissolved in toluene; that solution is mixed in a ratio of 1:1 with solutions of various polymethacrylates; a film is drawn out and observed at room temperature and at a higher temperature (e.g., 140° C.). Often it is not even necessary to form a film, because polymer incompatibility will frequently reveal itself by opacity when the polymer solutions are being mixed in the test tube.

| Polymer Blend | Judging the Film at | |
|---|---|---|
| | Room Temperature | 140° |
| Chlorinated rubber*/ polymethyl methacrylate** | clear | clear |
| Chlorinated rubber*/ copolymer of methyl methacrylate and butyl methacrylate (20:80)*** | clear | clear |
| Chlorinated rubber*/ polyisobutyl methacrylate**** | clear | partially cloudy |
| Chlorinated rubber*/ poly-2-ethyl-hexylmethacrylate***** | cloudy | cloudy |

**$\overline{M}$ = ca. 100,000 (product Plexigum M 910 ® by Rohm GmbH)
***$\overline{M}$ = ca. 100,000 (product Plexigum P 24 ® by Rohm GmbH)
****$\overline{M}$ = ca. 100,000 (product Plexigum P 26 ® by Rohm GmbH)
*$\overline{M}$ = 85,000 (viscosity pursuant to DIN 53015 8.5-10 mPa · s (chlorine content: ca. 67% by weight) product Pergut S 10 ® by Bayer AG
*****$\overline{M}$ = Produced by polymerization in solution of 2-ethyl-hexylmethacrylate in toluene (initiator: dilauroyl peroxide polymerization temperature: 70° C.)

Conclusion

The good compatibility of the chlorinated rubber with polymer esters of methacrylic acids declines as the ester becomes increasingly lipophilic.

By copolymerization of the 2-ethylhexylmethacrylate, incompatible with chlorinated rubber as a homopolymer, with the more compatible isobutyl methacrylate, polymer blends with a lower critical solution temperature (LCST) of ca. 100° C., for example, can be produced.

The polymer blend of chlorinated rubber with the copolymer 2-ethylhexyl-methacrylate/isobutyl-methacrylate meets the requirements of a polymer system P. The exact position of the LCST can be changed within certain limits by a change in the blend ratio and/or the addition of plasticizers or solvents.

EXAMPLE 2

Plate Glass Sandwich with Temperature-Controlled Translucency with Polymer Blend $P_1$-V/$P_2$-III 50 g of chlorinated rubber (Pergut ® by Bayer AG) were dissolved in toluene. After the addition of 100 g of isobutyl methacrylate, 100 g of 2-ethyl-hexylmethacrylate and 2 g of dilauroyl peroxide, polymerization was effected at 70° C., followed by reheating for 1 hour at 80° C.

The result was a white solution at 70° C. Cooling to room temperature yielded a highly viscous, clear, yellowish solution. Two glass plates (each ca. 0.5 mm thick) were glued together with a few drops of this polymer solution. The result was a glass-clear system which suddenly became opaque when heated over the LCST (ca. 60° C.). This transition was fully reversible.

Table 2 shows the translucency of the polymer blend thus prepared at room temperature and at 70° C.

TABLE 2

| Translucency of the Glass/Polymer Blend/Glass System | | |
|---|---|---|
| | Translucency (Light Transmission) % | |
| Light Wave Length | At Room Temperature | At 70° C. |
| 380 | 90 | 20 |
| 530 | 91 | 40 |
| 750 | 92 | 50 |

This experiment: Heating into the light-controlled two-phase range and cooling into the clear, one-phase range was repeated 40 times, with no observable change in the system.

Like the chlorinated rubber/copolymer of isobutyl-methacrylate-2-ethylhexylmethacrylate system, the copolymer of methyl methacrylate and ethyl acrylate (3:2)/chlorinated rubber system exhibits an LCST.

EXAMPLE 3

50 g of chlorinated rubber (Pergut S 10 ® by Bayer AG) were dissolved in 200 g of toluene. 120 g of methyl methacrylate, 80 g of ethyl acrylate and 2 g of dilauroyl peroxide were added. Polymerization was then effected at 70° C. Another 200 g of toluene were added. After reaction ceased, the mixture was maintained at 70° C. for another 2 hours.

Cooling yielded a viscous, clear, light yellow solution (solution 3A).

To solution 3A from Experiment 3 was added benzyl butyl phthalate in a proportion of 40% by weight (with reference to the polymer portion) and the result was drawn out on a glass plate and dried.

There resulted a glass-clear polymer film with a cloud point of 80° C.

EXAMPLE 4

A compatible polymer blend P (consisting of 30% by weight polystyrene [$\overline{M}_w$=ca. 100,000] and 70% by weight polyvinyl methyl ester [$\overline{M}_w$=ca. 50,000]) was produced by dissolving the polymers in toluene. The solution was applied to a glass pane 3 mm thick, 500 mm wide and 1000 mm long in such a way that after evaporation of the toluene a layer of the polymer blend P ca. 100 μm thick remained on the glass.

The result was a protective glass that at room temperature range up to ca. 100° C. is completely clear. If the protective glass pane is heated over 100° C., however, the pane turns white. When cooled down to temperature under 100° C. the pane becomes completely clear again. A repetition of the heating to temperatures over 100° C. again induces opacity. The process is therefore reversible.

EXAMPLE 5

Polymer blends P produced according to design: Use of polymers $P_1$ and $P_2$ with a relatively low glass transition temperature for synthesizing a rapidly and reversibly separating phase system.

Poly-2-ethylhexyl acrylate shows a refractive index of about 1.48 ($n_D^{20}$) its glass transition temperature being $-55°$ C. A copolymer made of 70% by weight of tetradecylmethacrylate (methacrylic ester of a mixture of $C_{12}$–$C_{18}$ alkanols with alkanols with an average carbon number of 14 in the alcohol portion) and 30% of styrene, refractive index $n_D^{20}$=1.51; glass transition temperature <room temperature.

Poly-2-ethylhexylacrylate and the above copolymer of tetradecylmethacrylate ordinarily are not compatible. They can, however be blended, if one of those polymers contains a comonomer with an acidic function, whereas the other one contains a basic function. That is: by introducing groups of complementary dissimilarity into each of the polymers one can produce compatibility of the system. By increasing the proportion of acid or basic functions, respectively in the polymers, their compatibility will impove i.e. the LCST value will go up.

As will be shown in the following examples the LCST of a given polymer may be altered ad libitum by adjusting the proportion of acid or base functions present in each polymer.

5.1. Preparation of polymer $P_2$-XI

A mixture consisting of 75 g of 3-dimethylamino-2,2-dimethyl-propyl-1-methacrylate (15% by weight)

297,5 g of tetradecylmethacrylate (as described above, 59.5% by weight)

127,5 g of styrene (25,5% by weight)

is bulk polymerized after adding 1.5 g of tert.-dodecylmer- captane as a modifier and 1 g of azoisobutyronitrile (AIBN) as initiator. Reaction conditions: 24 hours at 55° C. and finally 24 hours at 60° C.

One obtains a soft clear, faintly yellowish polymer material, with a specific viscosity $\eta_{spec}/C$=63 ml/g. The specific viscosity is determined at 25° C. in a Micro-Ubbelohde-Viscometer at $1.1 \leq \eta_{rel.} \leq 1.2$.

5.2. Preparation of polymer $P_2$-XII

The same polymerization procedure as in example 5.1 is used except that the proportions are modified as follows:

10 parts by weight of 3-dimethylamino-2,2-dimethyl-propyl-1-methacrylate 63 parts by weight of tetradecylmethacrylate 27 parts by weight of styrene One again obtains a soft, clear faintly yellowish polymer material; specific viscosity $\eta_{spec}/C$=56 ml/g.

5.3. Preparation of polymer $P_2$-XIII

The same polymerization procedure is used as in example 5.1 except that the proportions are modified as follows.

6 parts by weight of 3-dimethylamino-2,2-dimethylpropyl-1-methacrylate 65.8 parts by weight of tetradecylmethacrylate 28.2 parts by weight of styrene One again obtains a soft, clear, faintly yellowish polymer matter; specific viscosity $\eta_{spec}/C$=48 ml/g.

EXAMPLE 6

Preparation of polymer $P_1$-XI

To a reaction vessel containing 500 g of toluene and 1.25 g of tert.-butyl per-2-ethylhexanoate under argon as a protective gas a mixture consisting of 1.25 g of tert.butyl per-2-ethylhexanoate 0.75 g of dodecyl mercaptane
25 g of acrylic acid and
475 g of 2-ethylhexylacrylate
is added dropwise at 80° C. during 4 hours. Stirring is continued for another 4 hours at 80° C.

One obtains a solution containing ca. 50% by weight of the polymer. $\eta_{spec}/C = 18$ ml/g.

EXAMPLE 7

Preparation of a polymer blend P with LCST by mixing polymers $P_1$-XI with $P_2$-XI A toluene solution of about 20% by weight in polymer is produced mixing the 50% polymer solution of $P_1$-XI in toluene with the appropriate amount of $P_2$-XI. This polymer solution is spread out on a glass plate (0.2 mm thick) and is dried subsequently. One obtains a clear polymer film, which suddenly becomes opaque when heated above LCST. The position of the LCST will depend on the ratio of polymer $P_1$-XI to $P_2$-XI. On cooling below LCST the polymer blend which becomes clear again showing that the phase separation is in fact reversible.

Position of various LCST's as a function of the ratio of polymer $P_1$-XI to polymer $P_2$-XI present in the blend are given in TABLE 1.

TABLE 1

| Proportion of polymer components in polymer blend P | | LCST |
|---|---|---|
| $P_1$-XI | $P_2$-XI | [°C.] |
| 10 | 90 | 170 |
| 30 | 70 | 130 |
| 50 | 50 | 120 |
| 70 | 30 | 110 |
| 90 | 10 | 120 |

EXAMPLE 8

In an analogous manner as described above additional polymer blends based on polymers $P_1$-XI/$P_2$-XI are produced by mixing 50% by weight of $P_1$-XI with 50% by weight of $P_2$-XII or 50% by weight of $P_2$-XIII:

| 8.1 polymer blend $P_1$-XI/$P_2$-XII | LCST:75° C. |
|---|---|
| 8.2 polymer blend $P_1$-XI/$P_2$-XIII | LCST:54° C. |

EXAMPLE 9

A polymer blend P consisting of 50% by weight of polymer $P_1$-XI and 50% by weight of polymer $P_2$-XIII is imbedded in a matrix of polymethylmethacrylat (PMMA).
Basis support: PMMA plate, 2 mm thick
Intermediate layer: Punctured layer of PMMA, 0.8 mm thick (lattice sheet with a web distance of 6 mm, web height 1 mm.
Covering layer: PMMA, 2 mm thick.

Each lattice unit formed by the webs (having 5 mm×5 mm×0.8 mm) is filled with the polymer blend P consisting of 50% by weight of polymer $P_1$-XI and 50% by weight of polymer $P_2$-XIII. The multilayered plate thus formed is perfectly clear up to 45° C. At warming it up to 6020 C. the plate is turning opaque in the areas which contain the polymer blend in this way reducing transparency drastically. On cooling the plate below 50° C., it will turn perfectly transparent again. This procedure can be repeated.

EXAMPLE 10

Polybutylacrylate (Tg=45° C.) and poly-3-phenylpropylacrylate in an unmodified state are not compatible with one another. By incorporating groups of complementary dissimilarity (acid functions in one, basic functions in the other polymer) a compatible polymer blend can be produced. As in example 5 in this case, too LCST can be adjusted by way of modifying the content of acid versus base. Polymer $P_1$-XII (a copolymer of 97% by weight of butylacrylate and 3% by weight of acrylic acid) has a refractive index of $n_D^{20} = 1.47$. Polymer $P_2$-XIV (a copolymer of 96% by weight of 3-phenylpropyl-1-acrylate and 4% by weight of 3-dimethylamino-2,2-dimethyl-propyl-1-methacrylate) has a refractive index of $n_D^{20} = 1.56$. In the following preparation and handling of the polymer blend will be given in form of a dispersion which is particularly advantageous in case of a very low LCST.

Procedure:

10.1. Preparation of $P_1$-XII

In a polymerization vessel the following components are polymerized during 3 hours (at 50° C. bath temperature)
60 g of 1-propanol
1.8 g of acrylic acid
0.03 g of dodecyl mercaptane
58.2 g of n-butyl acrylate
0.12 g of tert.-butylperoxy neodecanoate.
One obtains a clear polymer blend ($\eta_{spec}/C = 53$ mg/g).

10.2. To the mixture obtained under 10.1 above
60 g of 1-propanol
1.3 g of 3-dimethylamino-2,2-dimethyl-propyl-1-methacrylate
31.2 g of 3-phenylpropyl-1-acrylate and
0.03 g of tert.-butylperoxyneodecanoate (=polymer $P_2$-XIV)
are added under argon and polymerized for 3 hours at 50° C. One obtains a viscous, white polymer emulsion, which yields after drying a clear film at room temperature. A film produced on a glass plate, which is perfectly clear from room temperature up to 65° C. on warming above its LCST at 80° C. will become opaque.

EXAMPLE 11

Preparation of polymer blend $P_1$-XIII/$P_2$-XIV

The same procedure is used as in example 10, except that a lower proportion of interacting functional groups is used. Hereby the LCST is lowered. In a polymerization flask a mixture consisting of
60 g of 1-propanol
1.5 g of acrylic acid
0.03 g of dodecyl mercaptane
58.5 g of n-butylacrylate
0.12 g of tert.butylperoxy neodecanoate
are polymerized during 3 hours under argon, bath temperature 50° C. A clear polymer solution ($\eta_{spez}/C = 56$ mg/g) is obtained (=polymer $P_1$-XIII). Subsequently one adds
60 g of 1-propanol
1.138 g of 3-dimethylamino-2,2-dimethyl propyl-1-methacrylate
31.36 g of 3-phenylpropyl-1-acrylate and
0.03 g of tert.butylperoxy neodecanoate.
The mixture is polymerized at 50° C. for 3 hours. (=polymer $P_2$-XV). One obtains a viscous, white polymer dispersion, which after drying will form a clear film. LCST=ca. 30° C.

Onto a plate of polymethylmethacrylate 2 mm thick one applies a layer ca. 200 μm thick of the polymer blend consisting of $P_1$-XIII/$P_2$-XV. After covering it with a covering foil of polymethylmethacrylate 100 μm thick one applies again a layer of the $P_1$-XIII/$P_2$-XV polymer blend (ca. 200 μm thick). This layer is covered by a layer of polymethylmethacrylate 1 mm thick.

All the operations as reported above, e.g. cleaning of the PMMA-plates, filtration and application of the lacquer were carried out under conditions of a Protective Clean Bench (class 100). One obtains a clear, colourless plate with a light transmittance in the visible range markedly above 80% at room temperature. On warming the plate above 35° C. the light transmittance is reduced by more than 20%. Cooling of the plate to 25° C. within less than 1 hour again leads to an increase of light transmittance amounting to as much as 80%.

The invention now being fully described, it will be apparent to one of ordinary skill in the art that many changes and modifications can be made thereto without departing from the spirit or scope of the invention as set forth herein.

Each and every publication, patent or otherwise, specifically identified in this specification represents a teaching of the understanding of those skilled in the art at the time this invention was made and is herein individually incorporated by reference to the same extent as if it had been physically reproduced in the location and for the purpose as identified by the context in which it is found.

What is claimed as new and desired to be secured by Letters Patent of the United States is:

1. A transparent covering with temperature-controlled translucency, which comprises:
a polymer blend P, formed from at least two unlike polymer constitutents $P_1$ and $P_2$ which differ in their index of refraction by at least 0.01, wherein said polymer blend has a lower critical solution temperature (LCST), whereby at temperatures under the critical solution temperature the polymer blend is single-phase and transparent and at temperatures above the critical solution temperature, polymer constituents $P_1$ and $P_2$ separate, on a support base.

2. The transparent covering according to claim 1 wherein the temperature differential between the LCST and the glass temperature Tg of polymer blend P is at least 20° C.

3. The transparent covering according to claim 1 wherein the polymers differ in their index of refraction by at least 0.03.

4. The transparent covering according to claim 1 wherein polymer blend P has an LCST under 150° C.

5. The transparent covering according to claim 1 wherein polymer blend P has an LCST under 100° C.

6. The transparent covering according to claim 1 wherein polymer blend P has an LCST under 50° C.

7. The transparent covering according to claim 1 wherein the reduction in transmission from >80% to <60% occurs within a temperature span of <20° C.

8. The transparent covering according to claim 1 wherein at least one of the two polymers $P_1$ or $P_2$ exhibits a carbon content of <80%.

9. The transparent covering according to claim 1 wherein at least one of the polymers that makes up polymer blend P is composed of at least 5% by weight of one or more groups with a double or triple bond involving carbon.

10. The transparent covering according to claim 1 wherein at least one of the polymers that make up polymer blend P is a compolymer constituent in which the predominant monomer constitutes no more than 95% by weight.

11. The transparent covering according to claim 1 wherein in the range from room temperature to LCST the polymer blend P has a single glass transition temperature Tg and contains no crystalline areas.

12. The transparent covering according to claim 1 wherein the polymer blend P contains aging or ultraviolet protective agents in proportions of from 0.01% to 5% by weight.

13. The transparent covering according to claim 1 wherein polymer blend P adheres to a support base.

14. The transparent covering according to claim 1 wherein the support base is colored.

15. A shaped article for glazing consisting of transparent covering according to claim 1.

16. The transparent covering according to claim 1 wherein upon an increase in temperature from 10° C. below the LCST to 10° C. above the LCST there is a reduction in light transmission through said polymer blend of at least 20%, where the determination is made on an unpigmented test sample 0.1 m thick.

17. The transparent covering according to claim 16 wherein the transmission is >80% within the temperature range of 10° C. below the LCST to at least 50° C. above the LCST.

18. The transparent covering according to claim 1 wherein in the separated state above the LCST two polymer phases co-exist side by side, of which at least one polymer phase exhibits a domain magnitude within the range of 10 $nm^2$ to $10^8$ $nm^2$.

19. The transparent covering according to claim 18 wherein at least one polymer phase exhibits a domain magnitude of $10^2$ $nm^2$ to $10^6$ $nm^2$.

20. The transparent covering according to claim 1, wherein at least one low molecular weight substance W selected from the group consisting of solvent, plasticizers, stabilizers and pigments is added to polymer blend P.

21. The transparent covering according to claim 20 wherein the low molecular substance W is a solvent for at least one of the polymers $P_1$ or $P_2$.

22. The transparent covering according to claim 20 wherein the low molecular weight substance W does not have the same index of refraction as polymers $P_1$ and $P_2$.

23. The transparent covering according to claim 20 wherein at least one of the two polymers $P_1$ or $P_2$ is not soluble in water within a temperature range from 0° to 100° C.

24. The transparent covering according to claim 20 wherein the polymers that make up the polymer blend P are not soluble in water.

25. The transparent covering according to claim 20 wherein a low molecular weight substance W equal to 0.1%–1000% by weight relative to polymers $P_1$ and $P_2$ is added to polymer blend P.

26. The transparent covering according to claim 25 wherein a low molecular weight substance W equal to 5%–300% by weight is added to the polymer blend P.

27. The transparent covering according to claim 25 wherein the low molecular weight substance W has a solid point of <10° C.

28. The transparent covering according to claim 1 wherein the glass temperature Tg of polymer blend P lies at least 50° C. below the LCST.

29. The transparent covering according to claim 28 wherein the glass temperature Tg of polymer blend P lies at least 100° C. below the LCST.

30. The transparent covering according to claim 1 wherein at least one of the polymers that makes up the polymer blend P has a content of more than 10% by weight of covalently bonded halogens selected from the group consisting of fluorine, chlorine and bromine.

31. The transparent covering according to claim 30 wherein the ratio of the halogen content, as a percentage by weight, in polymer $P_1$ to that in polymer $P_2$ is $>1.5:1$.

32. The transparent covering according to claim 1 wherein at least one of the polymers that make up the polymer blend P has a content of more than 10% by weight of covalently bonded chalcogens selected from the group consisting of oxygen and sulfur.

33. The transparent covering according to claim 32 wherein the ratio of the oxygen content, as a percentage by weight, in polymer $P_1$ to that in polymer $P_2$ is $>1.2:1$.

34. The transparent covering according to claim 1 wherein at least one of the two polymers $P_1$ or $P_2$ has an average molecular weight $\overline{M}_w$ of at least 2,000.

35. The transparent covering according to claim 34 wherein at least one of the two polymers $P_1$ or $P_2$ has an average molecular weight $\overline{M}_w$ of at least 10,000.

36. The transparent covering according to claim 34 wherein at least one of the two polymers $P_1$ or $P_2$ has an average molecular weight $\overline{M}_w$ in the range from 2,000 to 500,000.

37. The transparent covering according to claim 34 wherein both polymers $P_1$ and $P_2$ have an average molecular weight in the range from 10,000 to 500,000.

38. The transparent covering according to claim 1 wherein in polymer mixture P the blend ratio of polymer $P_1$ to polymer $P_2$ is in the range of 98:2 parts by weight to 2:98 parts by weight.

39. The transparent covering according to claim 38, wherein the blend ratio of polymer $P_1$ to polymer $P_2$ is in the range of 90:10 parts by weight to 10:90 parts by weight.

40. The transparent covering according to claim 38 wherein the blend ratio of polymer $P_1$ to polymer $P_2$ is in the range of 80:20 parts by weight to 20:80 parts by weight.

41. The transparent covering according to claim 1 wherein polymer blend P is colored.

42. The transparent covering according to claim 41 wherein a coloring agent soluble in polymer blend P is used for the color.

43. The transparent covering according to claim 41, wherein a pigment coloring agent with pigment particles is used for coloring, the diameter of the particles being no more than 50% of the average observed diameter of the polymer phase domains created by separation.

44. The transparent covering according to claim 1, wherein the layer of polymer blend is less than 1 mm in thickness.

45. The transparent covering according to claim 44, wherein said layer of polymer blend P is less than 0.1 mm thick.

46. The transparent covering according to claim 45, wherein said layer of polymer blend P is less than 0.05 mm thick.

47. The transparent covering according to claim 1 wherein at least one of the polymer constituents $P_1$ of polymer blend P is produced by emulsion polymerization.

48. The transparent covering according to claim 47 wherein both polymer constituents $P_1$ and $P_2$ of polymer blend P are produced in an emulsion polymerization process involving at least two steps.

49. The transparent covering according to claim 48 wherein the emulsion polymerization is carried out according to the core-shell principle, where a latex synthesized primarily of polymer constituent $P_1$ serves as a saturated latex for the polymerization by emulsion of the second polymer constituent.

50. The transparent covering according to claim 49 wherein the emulsion polymerization entails a process involving at least three steps, involving consecutively the polymerization of polymer constituent $P_1$, polymer constituent $P_2$ and polymer constituent PM, where PM is a polymer material compatible with said matrix material.

51. The transparent covering of claim 1, wherein said supported polymer blend P component is provided with a transparent overlying layer.

52. The transparent covering according to claim 51, wherein layered polymer blend P applied to said support base and covered with said transparent overlying layer, has the geometric shape of a sheet or pane.

53. The transparent covering according to claim 51, wherein none of the layers of said transparent covering, which are not the polymer blend layer nor a layer containing said polymer blend, has a thickness which exceeds 0.5 mm.

54. The transparent covering according to claim 51 wherein the support base and the overlying layer are of silicate glass.

55. The transparent covering according to claim 51 wherein the support base or the overlying layer is a transparent plastic.

56. The transparent covering according to claim 55 wherein the transparent plastic is selected from the group consisting of acrylic resins, polycarbonates, polyamides, polyesters, polystyrenes, polyvinyl halogenides, polyolefins, polyacetals, polysulfones and polyurethanes.

57. The transparent covering according to claim 1, wherein said polymer blend P, as a layer, is embedded in a matrix material on said support which matrix which has an index of refraction which coincides with the index of refraction of polymer blend P below the LCST of the polymer blend.

58. The transparent covering according to claim 57, wherein polymer blend P is embedded in said matrix material in the form of discrete particles with a diameter within the range of 20 nm to 200 μm.

59. The transparent covering according to claim 58, wherein said discrete particles of polymer blend P have a diameter within the range of 50 nm to 50 μm.

60. The transparent covering according to claim 58 wherein polymer blend P is in the form of discrete particles with a diameter within the range of 50 nm to 5 μm.

61. A transparent covering with temperature-controlled translucency, which comprises:

a polymer constituency of at least 0.1% by weight of polymer constituent $P_1$ covalently bonded to polymer constituent $P_2$, said polymer constituents $P_1$ and $P_2$ being unlike and having indexes of refraction which differ by at least 0.01, said polymer constituency having a lower critical solution temperature (LCST), whereby at temperatures under the critical solution temperature the polymer constituency is single-phase and transparent and at a temperature above the critical solution temperature, polymer constituents $P_1$ and $P_2$ separate, on a support base.

62. The transparent covering according to claim 61 wherein polymer constituent $P_1$ is covalently bonded to polymer constituent $P_2$ as a result of block copolymer structure or by graft copolymer structure.

63. The transparent covering according to claim 61 wherein the conditions $$n_{D\ matrix} = n_{D\ polymerizate\ P_1} (\Delta n > 0.001)$$

$$n_{D\ matrix} < n_{D\ polymerizate\ P_2} (\Delta n > 0.001)$$

$$n_{D\ matrix} \cong n_{D\ polymer\ blend} (\Delta n < 0.01)$$

are met simultaneously.

64. A transparent covering with temperature-controlled translucency, which comprises:
a polymer blend P, supported on a support base, which is formed from at least two unlike polymer constituents $P_1$ and $P_2$ which differ in their index of refraction by at least 0.01, wherein said polymer blend has a lower critical solution temperature (LCST), whereby at temperatures under the critical solution temperature the polymer blend is single-phase and transparent and at temperatures above the critical solution temperature, polymer constituents $P_1$ and $P_2$ separate, and wherein the enthalpy of mixing of the polymer constituents is exothermic.

* * * * *

UNITED STATES PATENT AND TRADEMARK OFFICE
CERTIFICATE OF CORRECTION

PATENT NO.   : 4,772,506
DATED        : Sep. 20, 1988
INVENTOR(S)  : Werner SIOL et al.

It is certified that error appears in the above-identified patent and that said Letters Patent is hereby corrected as shown below:

On the Title Page:

Item [54]: A word is misspelled in the title; the title should read as follows:

-- GLASS WITH TEMPERATURE-CONTROLLED TRANSLUCENCY --

Item [75]: The name of the second inventor is incorrect; please correct as follows:

-- Hans-Joachim Otto --

Signed and Sealed this

Seventh Day of February, 1989

Attest:

DONALD J. QUIGG

Attesting Officer

Commissioner of Patents and Trademarks